United States Patent
Fujita et al.

(10) Patent No.: US 10,585,423 B2
(45) Date of Patent: Mar. 10, 2020

(54) DATA PROCESSING APPARATUS, DATA PROCESSING SYSTEM, DATA PROCESSING METHOD, AND PROGRAM

(71) Applicant: YOKOGAWA ELECTRIC CORPORATION, Tokyo (JP)

(72) Inventors: Sho Fujita, Tokyo (JP); Kimikazu Takahashi, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 56 days.

(21) Appl. No.: 15/963,158

(22) Filed: Apr. 26, 2018

(65) Prior Publication Data

US 2018/0314238 A1    Nov. 1, 2018

(30) Foreign Application Priority Data

Apr. 28, 2017   (JP) .................. 2017-089882

(51) Int. Cl.
*G06F 19/00*   (2018.01)
*G05B 19/418*   (2006.01)

(52) U.S. Cl.
CPC ............. *G05B 19/4184* (2013.01); *G05B 2219/34465* (2013.01); *G05B 2219/34477* (2013.01)

(58) Field of Classification Search
CPC ...... G05B 19/4184; G05B 2219/34465; G05B 2219/34477
See application file for complete search history.

(56) References Cited

U.S. PATENT DOCUMENTS

| | | | |
|---|---|---|---|
| 2004/0225718 A1* | 11/2004 | Heinzel | G06Q 10/107 709/206 |
| 2013/0325158 A1 | 12/2013 | Kobayashi et al. | |
| 2017/0185623 A1* | 6/2017 | Valine | G06F 16/1734 |

FOREIGN PATENT DOCUMENTS

JP    5868784 B2    2/2016

* cited by examiner

*Primary Examiner* — Kidest Bahta
(74) *Attorney, Agent, or Firm* — Osha Liang LLP (57) ABSTRACT

A data processing apparatus includes an acquisition circuit that acquires time-series data comprising a plurality of values observed in a plurality of channels at a plurality of points in time; a change trend calculation circuit that calculates a change trend of the observed values at each of the points in time on a channel-by-channel basis; a memory that stores a plurality of judgment tables each indicating a change trend of previous values at each of the points in time within a predetermined time period up to the current point in time; a comparison circuit that compares change trend data comprising a set of change trends of the observed values for each of the channels within the predetermined time period with the judgment tables; and a notification output circuit that outputs a notification related to a temporal change in the observed values on the basis of a result of the comparison.

7 Claims, 6 Drawing Sheets

DATA PROCESSING APPARATUS, DATA PROCESSING SYSTEM, DATA PROCESSING METHOD, AND PROGRAM

CROSS-REFERENCE TO RELATED APPLICATION

This application claims priority from Japanese Patent Application No. 2017-089882 filed with the Japan Patent Office on Apr. 28, 2017, the entire content of which is hereby incorporated by reference.

BACKGROUND

1. Technical Field

The present disclosure relates to a data processing apparatus, a data processing system, a data processing method, and a program.

2. Description of Related Art

An operation monitoring terminal is typically provided in a control system in some cases to manipulate the operation of a process being a control target. The use of this terminal allows an operator being a user to freely select some of various pieces of time-series data indicating, for example, state quantities of the process measured by field devices and the like. The user interprets a change trend in time-series data selected by a display device of the operation monitoring terminal to, for example, find an abnormality and predict a future value. For example, a process monitoring system described in Japanese Patent No. 5868784 judges the state of a plant, on the basis of time-series data outputted from field devices that measure state quantities in an industrial process, and change trends in the state quantities, and displays the state and the state quantities.

SUMMARY

A data processing apparatus of the present disclosure includes: an acquisition device configured to acquire time-series data indicating observed values of a plurality of channels at a plurality of points in time; a change trend calculation device configured to calculate a change trend in an observed value at each of the points in time on a channel-by-channel basis; a comparison device configured to compare change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output device configured to output a notification related to a temporal change in the observed value on the basis of a result of the comparison.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A state quantity indicating the state of a process and a state quantity (such as a device degradation state quantity) indicating the operating state of a field device are usually graphically expressed as they are on a display device of an operation monitoring terminal. A user performs interpretation of their time-series data and prediction of their future values on the basis of his/her own experience and knowledge. In order to detect a sign of occurrence of an abnormality from these state quantities, it is desired to monitor a change in the state quantity at not only one point but each of a plurality of points. However, a combination of the plurality of points varies according to the event. Hence, the user needs to monitor many points at a time to detect every event. Hence, the user needs to grasp a combination of points according to the event. Therefore, the user is required to have a high operational capability of monitoring. In addition, a burden of the operation in monitoring tends to be heavy.

The present disclosure has been made considering the above points. In other words, a data processing apparatus, a data processing system, a data processing method, and a program are provided which allow a user who observes the state of a control system to appropriately grasp an event that has occurred and reduce a burden of monitoring on him/her.

(1) One aspect of the present disclosure is a data processing apparatus including: an acquisition device configured to acquire time-series data indicating observed values of a plurality of channels at a plurality of points in time; a change trend calculation device configured to calculate a change trend in an observed value at each of the points in time on a channel-by-channel basis; a comparison device configured to compare change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output device configured to output a notification related to a temporal change in the observed value on the basis of a result of the comparison.

(2) Another aspect of the present disclosure is the above-mentioned data processing apparatus, wherein the judgment table is stored event by event in the storage device, the comparison device specifies the judgment table with the highest degree of matching with the change trend data, and the notification output device outputs information on an event corresponding to the judgment table specified by the comparison device.

(3) Another aspect of the present disclosure is the above-mentioned data processing apparatus, wherein the notification output device determines a notification level that is a degree that brings attention to the notification in accordance with the degree of matching between the change trend data and the judgment table.

(4) Another aspect of the present disclosure is the above-mentioned data processing apparatus including a time-series range extraction device configured to extract time-series data indicating an observed value at each point in time within an analysis range from a first point in time to a second point in time, wherein the change trend calculation device calculates a slope of a linear function indicating a change trend in the observed values in the analysis range in such a manner as to minimize an objective function, the objective function is the sum of multiplied values at the points in time within the analysis range, the multiplied value is a numerical value obtained by multiplying a square value of a difference between a function value of the linear function and the observed value by a weight coefficient, and the weight coefficient is a numerical value that becomes higher with increasing elapsed time from the first point in time to each point in time.

(5) Another aspect of the present disclosure is the above-mentioned data processing system including: the above-mentioned data processing apparatus; and a control apparatus configured to control a plant, wherein the notification output device determines that the notification level is increased as the degree of matching between the change trend data and the judgment table is increased, and the control apparatus has a control device configured to execute the control in control mode corresponding to the notification level.

(6) Another aspect of the present disclosure is a data processing method including: using a data processing apparatus; acquiring time-series data indicating observed values of a plurality of channels at a plurality of points in time; calculating a change trend in an observed value at each of the points in time on a channel-by-channel basis; comparing change trend data indicating a set of change trends of observed values of the channels within a predetermined time up to the current point in time with judgment tables previously stored in a storage device, the judgment tables indicating a change trend in an observed value at each of a plurality of points in time within the predetermined time; and outputting a notification related to a temporal change in the observed value on the basis of a result of the comparison.

(7) Another aspect of the present disclosure is a program causing a computer included in a data processing apparatus to execute: an acquisition command to acquire time-series data indicating observed values of a plurality of channels at a plurality of points in time; a change trend calculation command to calculate a change trend in an observed value at each of the points in time on a channel-by-channel basis; a comparison command to compare change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output command to output a notification related to a temporal change in the observed value on the basis of a result of the comparison.

(8) Another aspect of the present disclosure is a non-transitory computer-readable recording medium that has recorded a program causing a computer included in a data processing apparatus to execute: an acquisition command to acquire time-series data indicating observed values of a plurality of channels at a plurality of points in time; a change trend calculation command to calculate a change trend in an observed value at each of the points in time on a channel-by-channel basis; a comparison command to compare change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output command to output a notification related to a temporal change in the observed value on the basis of a result of the comparison.

According to one or more embodiments of the invention, a user who observes the state of a control system can appropriately grasp an event that has occurred and reduce a burden of monitoring on him/her. For example, when it is necessary to monitor a combination of a plurality of state quantities to grasp a sign of occurrence of an abnormality, an event related to a pattern corresponding to a combination of change trends in the plurality of state quantities is notified. Hence, the user can grasp an event occurring in the process, such as a sign of occurrence of an abnormality, without depending on his/her experience or knowledge. Moreover, a load related to the grasping is reduced. Accordingly, the user can monitor substantially more pieces of time-series data.

An embodiment of the data processing apparatus, the data processing system, the data processing method, and the program of the present disclosure is described hereinafter with reference to the drawings.

Firstly, an example of the configuration of a control system according to one or more embodiments of the invention is described.

Figure 1:
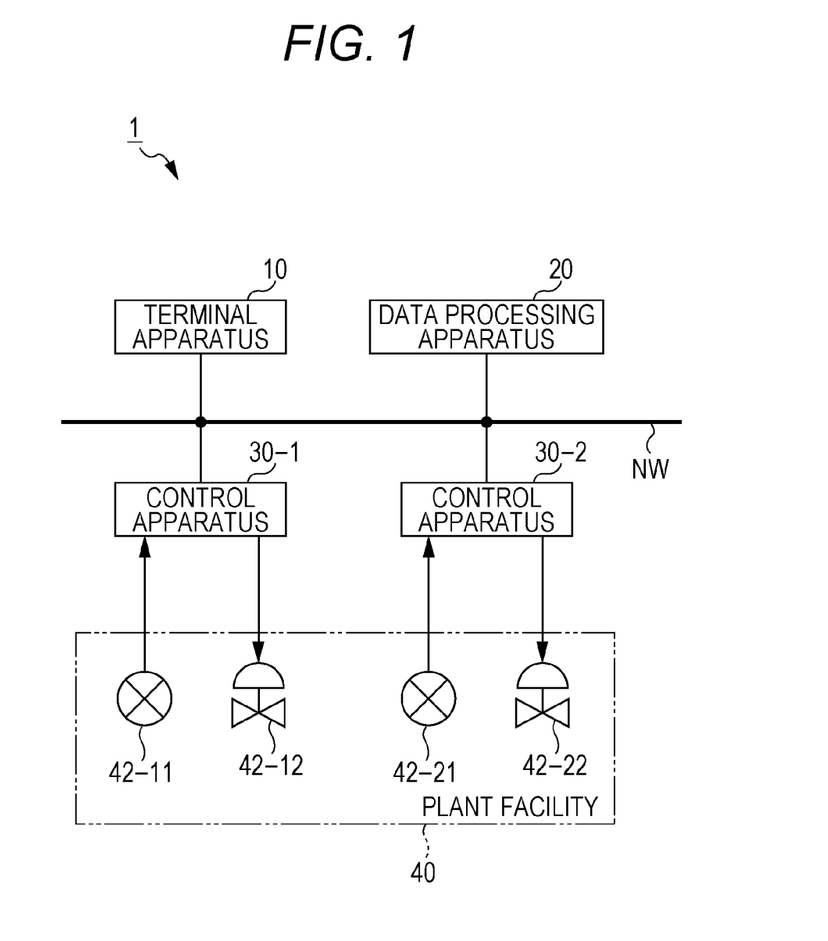
FIG. 1 is a block diagram illustrating an example of the configuration of a control system according to one or more embodiments of the invention.

FIG. 1 is a block diagram illustrating an example of the configuration of a control system 1 according to one or more embodiments of the invention.

The control system 1 according to one or more embodiments of the invention includes a terminal apparatus 10, a data processing apparatus 20, and a control apparatus 30. In the example illustrated in FIG. 1, the number of the control apparatuses 30 is two. In the following description, sub-numbers -1 and -2 are assigned to the control apparatuses to call them the control apparatus 30-1 and the control apparatus 30-2. Accordingly, these control apparatuses are distinguished. When the plurality of the control apparatuses 30 is collectively referred to, and also when it is not necessary to distinguish the plurality of the control apparatuses, they are simply called the control apparatus 30. A controlled system that is a control target of the control apparatus 30 is a plant facility 40. The terminal apparatus 10, the data processing apparatus 20, and the control apparatuses 30-1 and 30-2 are communicably and wired or wirelessly connected via a network NW. All or any two of the terminal apparatus 10, the data processing apparatus 20, and the control apparatus 30 may be configured in such a manner as to function as a single integrated apparatus.

The terminal apparatus 10 receives notification information from the data processing apparatus 20 via the network NW. The notification information is information for notifying the occurrence of an event such as an abnormality or its sign of the plant facility 40. The terminal apparatus 10 notifies the occurrence of the event in a human-recognizable form. Moreover, the terminal apparatus 10 may sequentially receive time-series data and change trend data, on a channel-by-channel basis, from the data processing apparatus 20. The time-series data is data indicating an observed value at each point in time. The change trend data is data indicating a slope as an index of a temporal change trend in an observed value at each point in time. The terminal apparatus 10 generates a display graph indicating an observed value at each point in time. The terminal apparatus 10 displays the generated display graph on a display device (described below). A change trend in an observed value at the current point in time may be further presented in the display graph.

The terminal apparatus 10 may be configured in such a manner as to function as, for example, an operation monitoring terminal or device management terminal. The operation monitoring terminal is a device mainly for an operator being a user to control the operation of the control apparatus 30, and further the state of the plant facility 40 being a control target. The device management terminal is a device mainly for maintenance personnel to manage the operating state of the control apparatus 30, and further the state of the plant facility 40. The terminal apparatus 10 may generate various pieces of instruction information on the basis of, for example, operation signals in accordance with operations accepted by an operation input device (described below). The instruction information includes information for manipulating the operating state of the control apparatus 30, such as the start and stop of control and a control parameter. The terminal apparatus 10 transmits the generated instruction information to the control apparatus 30. The terminal apparatus 10 may be configured in such a manner as to function as, for example, a personal computer, a workstation, a business-grade mobile terminal apparatus (a tablet), or a multi-function mobile phone.

The data processing apparatus 20 sequentially receives time-series data, channel by channel, from the control apparatus 30. The data processing apparatus 20 calculates a change trend in an observed value at each point in time indicated by the time-series data on a channel-by-channel basis. Moreover, a judgment table indicating change trends in observed values at each point in time within a predetermined period of time is preset for each event in the data processing apparatus 20. The data processing apparatus 20 compares a set of change trends in observed values of the channels within the predetermined period of time up to the current point in time, and each judgment table. Furthermore, the data processing apparatus 20 determines whether or not to output notification information on a temporal change in the observed values, on the basis of a result of the comparison. When determining that a judgment table matching the set of change trends in the observed values of the channels is present, the data processing apparatus 20 generates information on an event corresponding to the judgment table, as the notification information. The data processing apparatus 20 then transmits the generated notification information to the terminal apparatus 10.

Various pieces of time-series data are inputted from a field device 42 into the control apparatus 30. The control apparatus 30 transmits the inputted time-series data to the data processing apparatus 20. Observed values indicated by the inputted time-series data include, for example, an input value inputted from a sensor (such as the field device 42-11 or 42-21) installed in the plant facility 40 being the control target, and a state quantity indicating the state of the field device 42 or an I/O module (not illustrated). The I/O module relays various pieces of data between the field device 42 and the control apparatus 30. The input value corresponds to a controlled variable indicating the state of the plant facility 40. Examples of state quantities include the remaining power or an electromagnetic force of a battery being a power source of the field device 42, an electric resistance value indicating the deteriorated state of a component, and a current value. A value instructed by the instruction information inputted from the terminal apparatus 10 may be used as a target value of the input value. Alternatively, a value preset in the control apparatus 30 may be used. The control apparatus 30 performs predetermined control and computation on the input value in such a manner as to reduce a deviation of the output value from the target value. With the control and computation, the output values outputted to the plant facility 40 are sequentially calculated. The calculated output value corresponds to a manipulated variable. Examples of the control and computation include a PI control operation and a PID control operation. The control apparatus 30 outputs the calculated output value to an actuator (such as the field device 42-12 or 42-22) installed in the plant facility 40 being the control target. The type and the number of channels of the input value, and the type and the number of channels of the output value can vary according to the control and computation.

In the example illustrated in FIG. 1, input values are inputted from the field devices 42-11 and 42-21 into the control apparatuses 30-1 and 30-2. Output values are then outputted to the field devices 42-12 and 42-22. The control apparatus 30 may transmit, to the data processing apparatus 20, time-series data including an output value or deviation at each point in time as the observed value.

The control apparatus 30 may be configured in such a manner as to function as, for example, a PLC (programmable logic controller) in a DCS (distributed control system) or a FA (factory automation).

The operating state of the plant facility 40 is controlled by an output value outputted from the control apparatus 30. Moreover, an input value indicating the operating state of the plant facility 40 is inputted into the control apparatus 30.

Various field devices 42 are installed in the plant facility 40. Examples of the field devices 42 include a sensor for detecting the operating state of the plant facility 40, and an actuator for manipulating the operating state of the plant facility 40.

The sensor detects a physical quantity indicating the state of the plant facility 40. Examples of the sensor include a temperature sensor that detects a temperature, a pressure sensor that detects a pressure, a flowmeter that detects a fluid, an ammeter that detects a current, and a voltmeter that detects a voltage.

The actuator operates in accordance with the output value. The state of the plant facility 40 changes in accordance with the operation of the actuator. Examples of the actuator include a pump, a compressor, a valve, a motor, and a motor drive apparatus. As the output is increased, the operation amount of the actuator is generally increased. For example, the operation amount of the actuator is proportional to the output value. In the example illustrated in FIG. 1, the field devices 42-11 and 42-21 are the sensors, respectively. The field devices 42-12 and 42-22 are the actuators, respectively.

Each of the field device 42-11, a set of the control apparatus 30-1 and the field device 42-12, the field device 42-21, and a set of the control apparatus 30-2 and the field device 42-22 forms one control loop.

In the example illustrated in FIG. 1, the number of control loops is one per control apparatus 30. However, there may be a plurality of control loops. If there is a plurality of control loops, processes related to the individual control loops may be executed in parallel.

(Data Processing Apparatus)

Next, an example of the configuration of the data processing apparatus 20 according to one or more embodiments of the invention is described.

Figure 2:
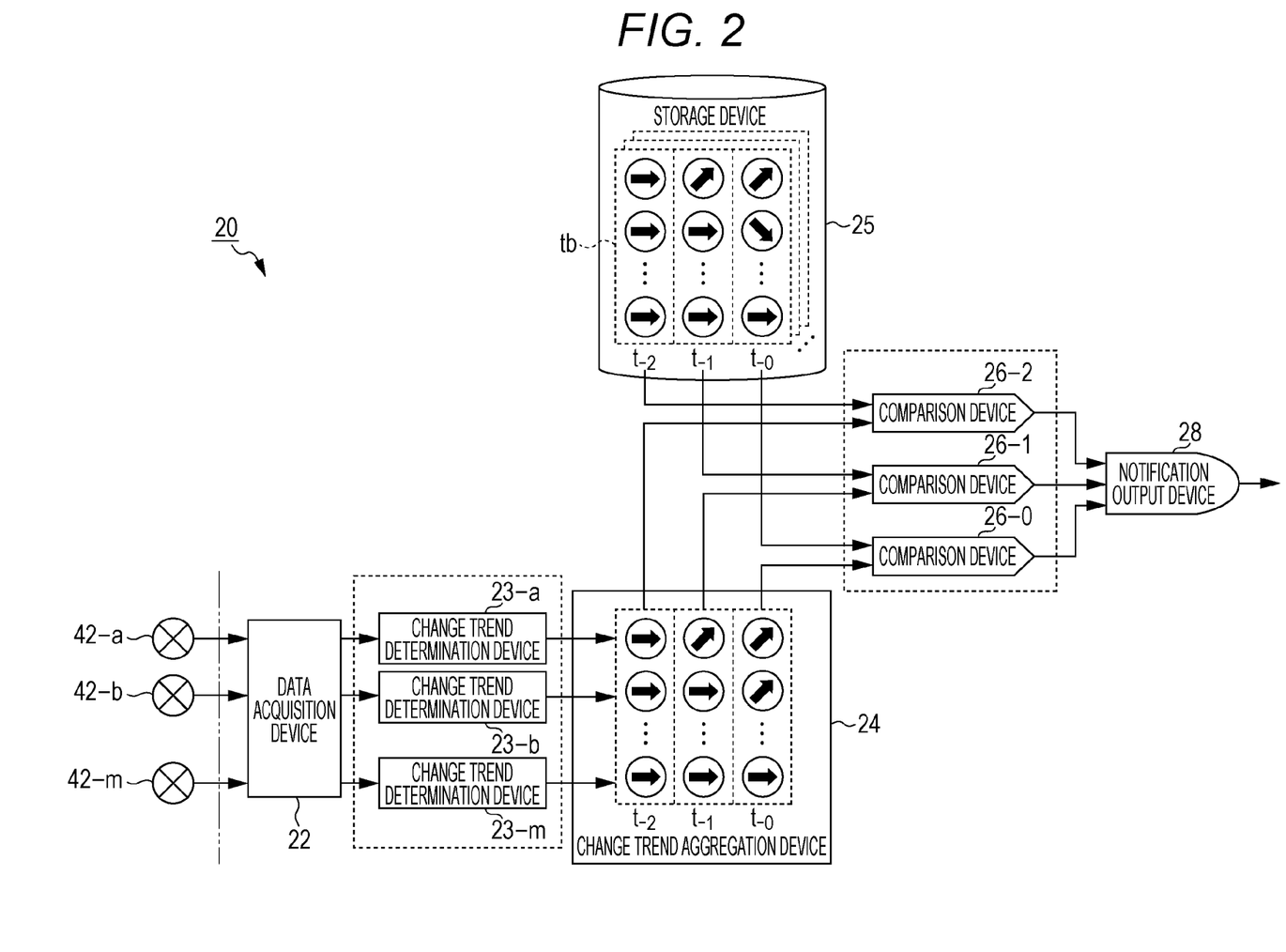
FIG. 2 is a block diagram illustrating an example of the configuration of a data processing apparatus according to one or more embodiments of the invention.

FIG. 2 is a block diagram illustrating an example of the configuration of the data processing apparatus 20 according to one or more embodiments of the invention.

The data processing apparatus 20 includes a data acquisition device or data acquisition circuit 22, a change trend determination device or change trend determination circuit 23, a change trend aggregation device or change trend aggregation circuit 24, a storage device or memory 25, a comparison device or comparison circuit 26, and a notification output device or notification output circuit 28.

The data acquisition device 22 acquires time-series data of each channel from the control apparatus 30 via the network NW. The data acquisition device 22 outputs the acquired time-series data to the change trend determination device 23. The data acquisition device 22 includes, for example, an input/output interface. In the example illustrated in FIG. 2, time-series data indicating input values from the field devices 42-a to 42-m through m channels (m is an integer equal to or greater than one) as the observed values is inputted into the data acquisition device 22. The field devices 42-a to 42-m correspond to the field devices 42-11 and 42-21 illustrated in FIG. 1. In the following description, the channels related to the input values from the field devices 42-a to 42-m are called channels a to m, respectively.

Time-series data of each channel is inputted from the data acquisition device 22 into the change trend determination device 23. The change trend determination device 23 calculates a slope indicating, for an observed value at each point in time indicated by the time-series data, a change trend in accordance with a time of the observed value, on a channel-by-channel basis. The change trend determination device 23 discretizes the value of the calculated slope and determines the state value (status). The change trend determination device 23 outputs the state value of each channel to the change trend aggregation device 24. The configuration of the change trend determination device 23 is described below.

The change trend aggregation device 24 aggregates channel-by-channel state values of n (n is an integer equal to or greater than two) points in time within a predetermined period up to the current point in time, the state values being inputted from the change trend determination device 23 within the predetermined period, throughout the channels. In this manner, the change trend aggregation device 24 forms change trend data indicating time series of the aggregated state values within the predetermined period. The change trend aggregation device 24 outputs the formed change trend data to the comparison device 26. The change trend data indicates a pattern of change trends in the observed values within the predetermined period. In the example illustrated in FIG. 2, change trend data indicating state values of the channels a to m at three points in time, $t_2$ to $t_0$, up to the current point in time $t_0$. Here, the current point in time t0 indicates the latest point in time at that time. The orientation of an arrow enclosed by a circle indicates an observed value. For example, a rightward-directed arrow and an upward-and-rightward-directed arrow indicate that the change trends are "constant" and "sudden increase," respectively.

A predetermined judgment table for each event is previously stored in the storage device 25. An abnormality in the state of the plant facility 40, or a state (sign) which may lead to the abnormality, is employed as the event. The judgment table for each event includes a typical time series of state values of each channel within a predetermined period, the time series being presented upon occurrence of the event. In other words, the judgment table indicates a pattern of change trends in observed values for each event. Moreover, the judgment table may further include notification information for each event. Furthermore, the notification information may be associated with a time series of each channel. A specific example of the judgment table is described below.

The change trend data is inputted from the change trend aggregation device 24 into the comparison device 26. The comparison device 26 reads the judgment table, event by event, from the storage device 25. The comparison device 26 compares the read judgment tables with the inputted change trend data. The comparison device 26 specifies a judgment table indicating a time series of state values of each channel, the time series matching an event-by-event time series of state values of each channel indicated by the change trend data. Here, the comparison device 26 determines whether or not the state values of the channels indicated by the judgment table match the corresponding state values of the channels indicated by the change trend data, for each point in time. In the example illustrated in FIG. 2, the comparison devices 26-0, 26-1, and 26-2 make this determination for the current point in time t0, a time t-1, and a time t-2, respectively. When determining that the state values match each other, the comparison device 26 outputs comparison result information indicating the matching of the time series to the notification output device 28. When notification information is associated with the specified judgment table, the comparison device 26 may add the notification information to the comparison result information, and output the information to the notification output device 28.

When determining whether or not the time series of the state values of the channels match each other, the comparison device 26 does not necessarily refer to time series of all the channels. Time series of a main part of the channels may be referred to. Channels having a significant difference in the state value according to the occurrence or non-occurrence of an event are simply required to be used as the channels targeted for the determination. Therefore, channels targeted for the determination can vary according to the events.

When the comparison result information inputted from the comparison device 26 indicates matching between the time series, the notification output device 28 outputs the comparison result information to the terminal apparatus 10 via the network NW.

(Change Trend Determination Device)

Figure 3:
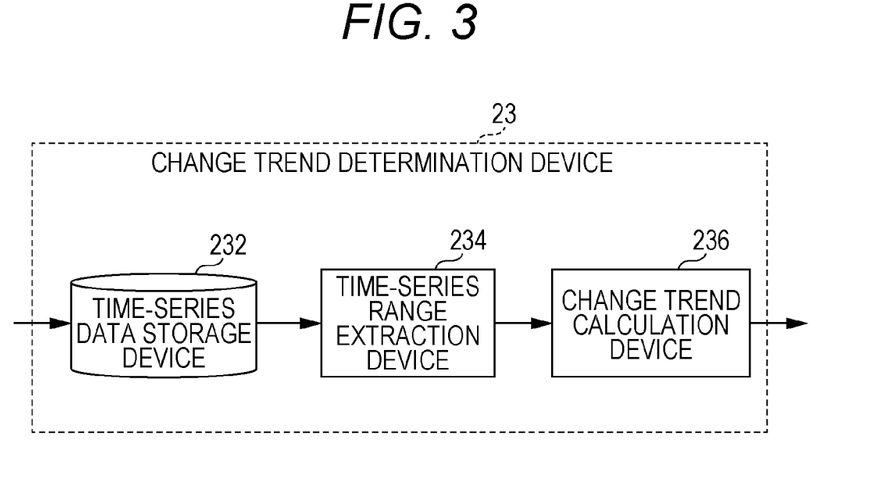
FIG. 3 is a block diagram illustrating an example of the configuration of a change trend determination device according to one or more embodiments of the invention.

Next, an example of the configuration of the change trend determination device 23 according to one or more embodiments of the invention is described. FIG. 3 is a block diagram illustrating an example of the configuration of the change trend determination device 23 according to one or more embodiments of the invention.

The change trend determination device 23 includes a time-series data storage device or memory 232, a time-series range extraction device or time-series range extraction circuit 234, and a change trend calculation device or change trend calculation circuit 236. The change trend determination device 23 may include a computation device such as a one-chip CPU (central processing unit).

The time-series data storage device 232 sequentially stores observed values inputted from the data acquisition device 22 (FIG. 2). The observed values are accumulated in the time-series data storage device 232 in the order of times when the observed values are acquired. A group of the accumulated observed values forms time-series data indicating an observed value at each point in time. The time-series data storage device 232 may include, for example, a FIFO (First-in First-out) buffer memory.

The time-series range extraction device 234 acquires, from the time-series data storage device 232, time-series data indicating an observed value at each point in time within a predetermined data acquisition period up to the current point in time. The data acquisition period is simply required to be a period including an analysis range from a reference point in time to the current point in time. The reference point in time is a past point a predetermined period of time back from the current point in time. When the change trend calculation device 236 calculates a moving average value at the reference point in time, the length of the data acquisition period is required to be at least double the length of the analysis range. The time-series range extraction device 234 outputs the acquired time-series data to the change trend calculation device 236.

The time-series data is inputted from the time-series range extraction device 234 into the change trend calculation device 236. The change trend calculation device 236 uses the time-series data to calculate a slope of a linear function indicating a trend of change in an observed value at each point in time within the analysis range in such a manner as to minimize an objective function. The objective function is the weighted sum of squares of a difference value between a function value of the linear function and the observed value at each point in time. A weight coefficient at each point in time is required to become a higher numerical value as the elapsed time from the reference point in time to the point in time becomes longer.

The change trend calculation device 236 may calculate a centered moving average value with the reference point in time as a central time by using the time-series data. The centered moving average value is a simple average value of function values at points in time within a moving average section. The moving average section is a section from a past point the analysis range back from the reference point in time to the current point in time. The length of the moving average section is called a window size below. Moreover, the centered moving average value is simply called a moving average value. The change trend calculation device 236 may calculate the intercept of the linear function in such a manner that a function value at the reference point in time is equal to the centered moving average value. The change trend calculation device 236 may calculate a function value at each point in time within the analysis range on the basis of the calculated intercept and slope. The change trend calculation device 236 associates information indicating the calculated slope with the time-series data, and outputs the information to the terminal apparatus 10 (FIG. 1). The time-series data may further include one or both of a function value and a moving average value at each point in time.

The change trend calculation device 236 discretizes the value of the calculated slope and determines its state value. Discretization determines one of state quantities at predetermined levels. The state quantities have, for example, the following five levels:

"Sudden increase," "gentle increase," "constant," "gentle decrease," and "sudden decrease."

"Sudden increase" is given when the slope of the observed value is greater than a predetermined threshold 1. "Gentle increase" is given when the slope of the observed value is greater than a predetermined threshold 2 and is equal to or less than the threshold 1. "Constant" is given when the slope of the observed value is equal to or greater than a predetermined threshold 3 and is equal to or less than the threshold 2. "Gentle decrease" is given when the slope of the observed value is equal to or greater than a predetermined threshold 4 and is less than the threshold 3. "Sudden decrease" is given when the slope of the observed value is less than the threshold 4. Here, both of the thresholds 1 and 2 are positive values greater than zero. Moreover, the threshold 1 is greater than the threshold 2. Both of the thresholds 3 and 4 are negative values less than zero. The threshold 4 is less than the threshold 3.

(Method for Calculating Change Trend)

Next, a specific example of a method for calculating a change trend in time-series data is described.

An observed value at time $t_i$ forming time-series data inputted into the change trend calculation device 236 is represented by $x_{t_i}$. i is an integer indicating the order of points in time. Time $t_N$ indicates a time at the current point in time. A window size W is preset in the change trend calculation device 236. The window size W corresponds to the number, 2K+1, of observed values within the moving average section. K is an integer equal to or greater than one, the integer indicating the number of observed values within the analysis range.

The change trend calculation device 236 calculates a moving average value $<x_{t_{N-K}}>$ at a reference point in time $t_{N-K}$ being a past time K points back from the current point in time $t_N$. In this stage, the observed value at the current point in time $t_N$ is the latest observed value. At the current point in time $t_N$, a moving average value at a time later than the reference point in time $t_{N-K}$ cannot be calculated. Hence, the change trend calculation device 236 calculates a function value of a linear function indicating a change trend in the observed value at each time later than the reference point in time $t_{N-K}$. The change trend calculation device 236 employs the moving average value $<x_{t_{N-K}}>$ at the reference point in time $t_{N-K}$ as a function value at the reference point in time $t_{N-K}$. The change trend calculation device 236 uses moments regression to calculate a slope $a_{t_N}$ of a linear function $<x_{t_{N-K}}>+a_{t_N}(t_{N-K+i}-t_{N-K})$ at each time $t_{N-K+i}$. Moments regression is, for example, a method for minimizing an objective function J illustrated in equation (1) to calculate the slope $a_{t_N}$.

$$J=\Sigma_{i=1}^{K}\{(x_{t_{N-K+i}}-<x_{t_{N-K}}>)-a_{t_N}(t_{N-K+i}-t_{N-K})\}^2(t_{N-K+i}-t_{N-K}) \qquad (1)$$

In equation (1), $t_{N-K+i}-t_{N-K}$ indicates the elapsed time from the reference point in time $t_{N-K}$ at time $t_{N-K+i}$. Moreover, the value $<x_{t_{N-K}}>+a_{t_N}(t_{N-K+i}-t_{N-K})$ subtracted within { ... } corresponds to a function value of the time $t_{N-K+i}$ of the linear function. Therefore, equation (1) indicates that the objective function is obtained by taking the sum of multiplied values within the analysis range, the multiplied values being obtained by multiplying, by the elapsed time $t_{N-K+i}-t_{N-K}$, a square value of a difference value obtained by subtracting the function value of the linear function from the observed value $x_{t_{N-K+i}}$ at time $t_{N-K+i}$. In equation (1), a portion represented by { . . . } is a term used in a normal least squares method.

The change trend calculation device 236 uses a relationship given by equation (2) when calculating the slope $a_{t_N}$ to minimize the objective function J illustrated in equation (1).

$$a_{t_N} = \frac{\sum_{i=1}^{K}(x_{t_{N-K+i}} - <x_{t_{N-K}}>)(t_{N-K+i} - t_{N-K})^2}{\sum_{i=1}^{K}(t_{N-K+i} - t_{N-K})^3} \quad (2)$$

Equation (2) is derived from a condition that the derivative obtained by differentiating the objective function J with respect to the slope $a_{t_N}$ is zero.

In the above-mentioned example, when the objective function J is calculated, the square value of the difference value is multiplied by the elapsed time $t_{N-K+i}-t_{N-K}$. Hence, the newer the observed value is, the greater the difference value between the observed value and the function value, and the newer observed value contributes more to the objective function J. Hence, the temporal change of an observed value close to the current point in time is more focused. Therefore, the function value indicating a change trend close to the intuition of the user is estimated without generating a delay in the phase of the function value with respect to the phase of the observed value.

As long as the set analysis range up to the current point in time $t_N$ is a fixed period, the change trend calculation device 236 can calculate the slope $a_{t_N}$ by using equation (2) even if a missing point where the observed value cannot be acquired is present in a part of the analysis range. Hence, even if there is a situation where the measurement value from the field device 42 (FIG. 1) cannot be temporarily measured, the function value can be stably calculated.

The above-mentioned example can also be applied to a case where the intervals between points in time are irregular. However, when the intervals between points in time are constant intervals d, equation (1) is modified as illustrated in equation (3).

$$J=\Sigma_{i=1}^{K}\{(x_{t_{N-K+i}}-<x_{t_{N-K}}>)-a_{t_N}id\}^2 id \quad (3)$$

In equation (3), the time $t_i$ is $t_1+(i-1)$ d. A relationship illustrated in equation (4) is obtained as the condition that the derivative obtained by differentiating the objective function J illustrated in equation (3) with respect to the slope $a_{t_N}$ is zero.

$$a_{t_N} = \frac{\sum_{i=1}^{K}(x_{t_{N-K+i}} - <x_{t_{N-K}}>)(id)^2}{\sum_{i=1}^{K}(id)^3} \quad (4)$$

The denominator of equation (4) is a constant. The value of the constant is $K^2(K+1)^2 \cdot d^3/4$. The change trend calculation device 236 is simply required to use a preset constant when calculating the slope $a_{t_N}$ by using the relationship illustrated in equation (4). A process for sequentially calculating constants is omitted to further reduce the amount of calculation. Hence, placement in a device whose computation resource is relatively small (for example, an incorporated device), or the like becomes easy.

The case where a weight coefficient $w_i$ by which the square value of the difference between the observed value at each point in time tN−K+i and the function value is multiplied is proportional to the elapsed time $t_{N-K+i}-t_{N-K}$ from the reference point in time $t_{N-K}$ is taken as an example of the objective function J illustrated in equation (3). However, the objective function J is not limited to this example. The weight coefficient $w_i$ may be generalized to a monotonously increasing positive value with the increasing elapsed time $t_{N-K+i}-t_{N-K}$. It is also possible to preset the weight coefficient $w_i$ as an element value of a K-dimensional weight coefficient vector in the change trend calculation device 236. In this case, the objective function J illustrated in equation (3) is generalized as illustrated in equation (5).

$$J=\Sigma_{i=1}^{K}\{(x_{t_{N-K+i}}-<x_{t_{N-K}}>)-a_{t_N}id\}^2 w_i \quad (5)$$

A relationship illustrated in equation (6) is obtained as a condition that the derivative obtained by differentiating the objective function J illustrated in equation (5) with respect to the slope $a_{t_N}$ is zero. The change trend calculation device 236 may calculate the slope $a_{t_N}$ by using equation (6).

$$a_{t_N} = \frac{\sum_{i=1}^{K}(x_{t_{N-K+i}} - <x_{t_{N-K}}>)id \cdot w_i}{\sum_{i=1}^{K}(id)^2 w_i} \quad (6)$$

If the intervals between points in time are irregular, the change trend calculation device 236 may calculate the slope $a_{t_N}$ by using equation (7).

$$a_{t_N} = \frac{\sum_{i=1}^{K}(x_{t_{N-K+i}} - <x_{t_{N-K}}>)(t_{N-K+i} - t_{N-K})w_i}{\sum_{i=1}^{K}(t_{N-K+i} - t_{N-K})^2 w_i} \quad (7)$$

Equation (7) is obtained by replacing the elapsed time $t_{N-K+i}-t_{N-K}$ from the reference point in time $t_{N-K}$ in equation (2) with the weight coefficient $w_i$.

Moreover, as illustrated in equation (8), the change trend calculation device 236 may calculate the slope $a_{t_N}$ by using, as the weight coefficient $w_i$, a function w(t) depending on the elapsed time t from the reference point in time $t_{N-K}$.

$$a_{t_N} = \frac{\sum_{i=1}^{K}(x_{t_{N-K+i}} - <x_{t_{N-K}}>)(t_{N-K+i} - t_{N-K})w(t_{N-K+i} - t_{N-K})}{\sum_{i=1}^{K}(t_{N-K+i} - t_{N-K})^2 w(t_{N-K+i} - t_{N-K})} \quad (8)$$

As an example, the above-mentioned change trend calculation device 236 calculates a slope indicating a trend of change in an observed value at each point in time in such a manner as to minimize the weighted sum of squares of the difference value between the observed value and the function value of the linear function at each point in time as the objective function. However, the calculation method is not limited to this. For example, the change trend calculation device 236 may calculate a slope indicating a trend of temporal change in an observed value at each point in time in such a manner as to minimize the sum of squares of the difference value between the observed value and the function value of the linear function at each point in time as the objective function. Moreover, the change trend calculation device 236 may cause a predetermined first derivative filter to act on the observed value to calculate the slope. The first derivative filter is, for example, a filter for calculating a difference between an observed value at the following point in time and an observed value at a previous point in time as the slope at the current point in time. However, noise of a high-frequency component may be superimposed on an observed value. Hence, there is a tendency that the slope calculated by the above-mentioned method is more stable than the slope calculated by the first derivative filter.

(Terminal Apparatus)

Figure 4:
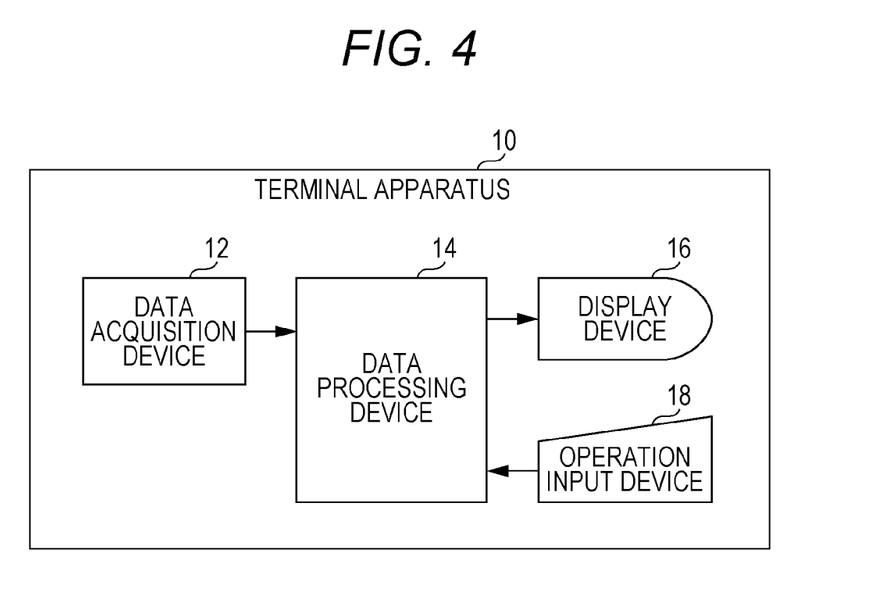
FIG. 4 is a block diagram illustrating an example of the configuration of a terminal apparatus according to one or more embodiments of the invention.

Next, an example of the configuration of the terminal apparatus 10 according to one or more embodiments of the invention is described. FIG. 4 is a block diagram illustrating an example of the configuration of the terminal apparatus 10 according to one or more embodiments of the invention.

The terminal apparatus 10 includes a data acquisition device or data acquisition circuit 12, a data processing device or data processing circuit 14, a display device 16, and an operation input device 18.

The data acquisition device 12 acquires comparison result information from the data processing apparatus 20 via the network NW. The data acquisition device 12 outputs the acquired comparison result information to the data processing device 14.

Moreover, the data acquisition device 12 receives time-series data of each channel from the data processing apparatus 20. The received time-series data is outputted by the data acquisition device 12 to the data processing device 14. The data acquisition device 12 is, for example, a communication interface that is wired or wirelessly connected to the network NW. Means for the data acquisition device 12 acquiring data is not necessarily the network NW. The data acquisition device 12 may acquire data stored in a detachable storage medium (such as flash memory) that is physically mounted thereon.

The data processing device 14 processes a notification indicating the occurrence of an abnormality, or an event of a sign pointing to the abnormality, when the comparison result information is inputted from the data acquisition device 12 into the data processing device 14. In the notification, visual data indicating, for example, characters, graphics, or symbols, or any combination thereof is used. The data processing device 14 outputs a notification command for giving a notification, to the display device 16. The display device 16 displays a notification based on the data inputted from the data processing device 14. The notification may be, for example, a warning (alarm) indicating the occurrence of an abnormality, or an event of a sign pointing to the abnormality. Alternatively, the notification may be a message indicating the occurrence. When information indicating the event is added to the comparison result information inputted into the data processing device 14, information indicating each individual event may be included in the notification displayed on the display device 16.

The format of the notification is not necessarily visual information. When the terminal apparatus 10 includes a playback device (for example, an unillustrated speaker) that plays audio, the data processing device 14 outputs, to the playback device, predetermined audio such as a warning sound or message voice. The playback device plays a warning sound or message voice based on the audio data inputted from the data processing device 14. Moreover, when a different terminal apparatus (not illustrated) is connected to the network NW, the data processing device 14 may transmit, to another device, information in a form of, for example, a message indicating the occurrence of the event. The information may be transmitted as, for example, an electronic mail. A device being a transmission destination issues, for example, a notification based on the received electronic mail, as a notification in accordance with the information received from the terminal apparatus 10.

The data processing device 14 may generate graph data representing an observed value at each point in time graphically on the basis of the time-series data inputted from the data acquisition device 12. When the time-series data includes a slope at the current point in time, the data processing device 14 includes the slope at the current point in time in the time-series data from the data acquisition device 12. In this case, the data processing device 14 may generate graph data further illustrating the slope at the current point in time. Here, the data processing device 14 may generate graph data further illustrating a moving average value at each point in time up to the reference point in time, and a function value at each point in time after the reference point in time. When generating graph data, the data processing device 14 converts each numerical value and a time at each point in time into coordinate values in the vertical and horizontal directions, respectively. Forms (for example, any of color, shape, line type, line width, and size, or any combination thereof) of symbols and graphics indicating the observed value, the function value, and the moving average value, and forms (any of thickness, size, font type, and font style, or any combination thereof) of characters may be different between these values. The data processing device 14 outputs the generated graph data to the display device 16.

The data processing device 14 may control the display of an observed value on the basis of information instructed by an operation signal inputted from the operation input device 18. For example, when time-series data of a plurality of channels is inputted into the data processing device 14, the data processing device 14 may update time-series data of channels targeted for processing to the time-series data of the channels instructed by the operation signal. In this case, examples of observed values that are possible processing targets and are related to the time-series data of the instructed channels include an input value inputted from the field device 42, an output value outputted to the field device 42, a deviation of the output value from its target value, and a state quantity indicating the state of the field device or I/O module.

Moreover, the data processing device 14 may perform a process related to the operation of the control apparatus 30 on the basis of the information instructed by the operation signal inputted from the operation input device 18. For example, the data processing device 14 specifies a target value instructed by the operation signal, as a control target value. The data processing device 14 may specify a parameter for offering the target value. The data processing device 14 transmits, to the control apparatus 30, instruction information indicating the specified target value or parameter.

The display device 16 displays various pieces of information inputted from the data processing device 14 in such a manner as to be visually recognizable to a user. Examples of the display device 16 include an LCD (liquid crystal display), an OELD (organic electro luminescence display), and the like.

The operation input device 18 accepts the user's operation, and generates an operation signal in accordance with the accepted operation. The operation input device 18 outputs the generated operation signal to the data processing device 14. The operation input device 18 may be configured in such a manner as to include a general-purpose member such as a mouse, a keyboard, or a touch sensor. Alternatively, the operation input device 18 may include a dedicated member such as a button, a lever, or a knob.

(Data Processing)

Figure 5:
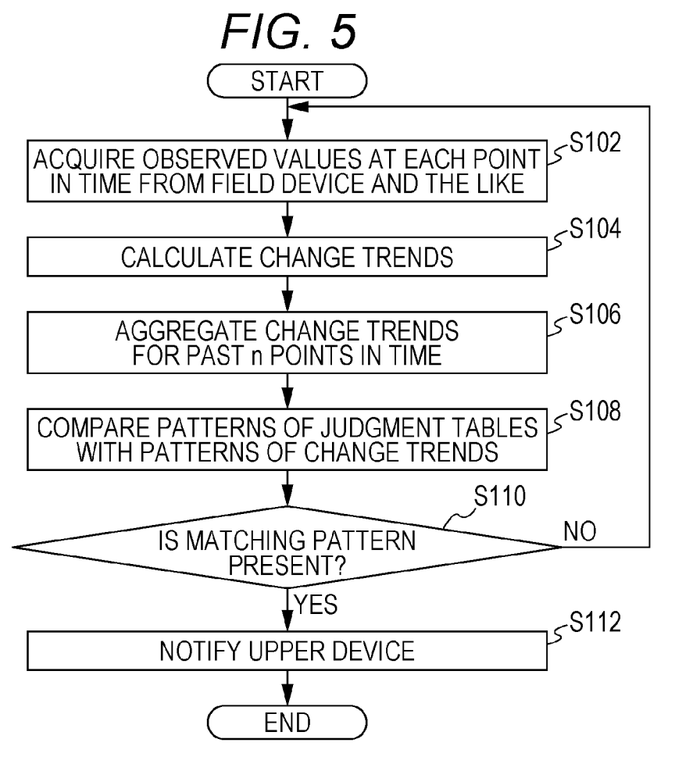
FIG. 5 is a flowchart illustrating an example of data processing according to one or more embodiments of the invention.

Next, data processing according to one or more embodiments of the invention is described. FIG. 5 is a flowchart illustrating an example of data processing according to one or more embodiments of the invention.

(Step S102) The data acquisition device 22 acquires time-series data indicating an observed value at each point in time, channel by channel, from the field devices 42. Data processing then proceeds to a process of step S104.

(Step S104) The change trend determination device 23 calculates a slope indicating a change trend in accordance with a time of an observed value at each point in time, for the observed value at the point in time, channel by channel. Furthermore, the change trend determination device 23 discretizes the value of the calculated slope, and determines its state value. Data processing then proceeds to a process of step S106. (Step S106) The change trend aggregation device 24 aggregates state values of n points in time up to the current point in time throughout m channels, and forms change trend data. Data processing then proceeds to a process of step S108.

(Step S108) The comparison device 26 compares a channel-by-channel time series of the state values indicated by the change trend data, that is, a pattern of the change trends with a pattern of change trends indicated by a judgment table for each event. Data processing then proceeds to a process of step S110.

(Step S110) The comparison device 26 determines whether or not there is a judgment table presenting a pattern of change trends matching the pattern of the change trends indicated by the change trend data. If it has been determined that the matching pattern is present (step S110 YES), data processing proceeds to a process of step S112. If it has been determined that the matching pattern is not present (step S110 NO), data processing returns to the process of step S102.

(Step S112) The notification output device 28 transmits comparison result information indicating the matching of the patterns to the terminal apparatus 10 being a device in a higher layer than its own apparatus (an upper device). Here, higher indicates a placement at a portion logically closer to the terminal apparatus 10, between the plant facility 40 as the control target and the terminal apparatus 10 for monitoring the control state, in the control system 1. Further, the terminal apparatus 10 issues a notification indicating the occurrence of an abnormality, or a sign pointing to the abnormality. The process illustrated in FIG. 5 then ends.

(Judgment Table)

Figure 6:
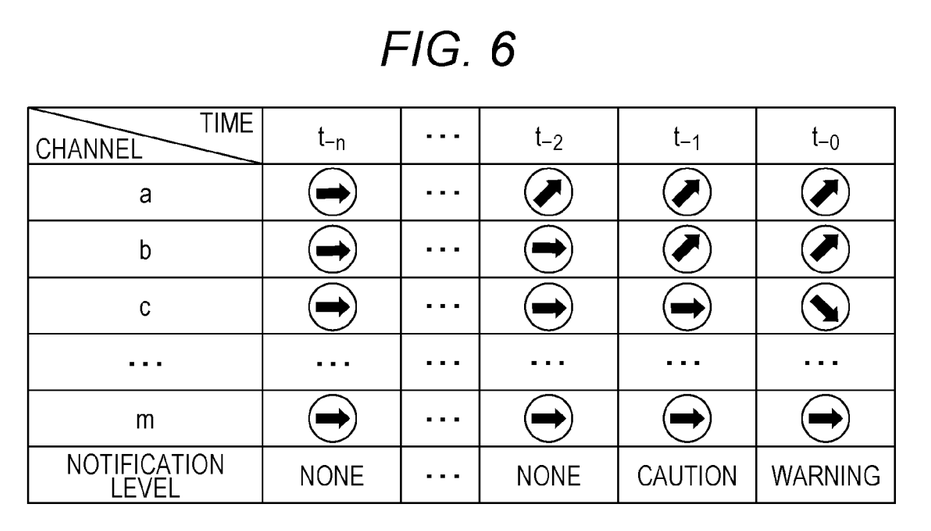
FIG. 6 is a diagram illustrating an example of a judgment table according to one or more embodiments of the invention.

Next, a specific example of the judgment table is described. FIG. 6 is a diagram illustrating an example of the judgment table according to one or more embodiments of the invention. Each row and each column indicate a channel and time. For example, state values at time $t_{-n}$ are "constant" in all the channels. State values of channels a, b, c, . . . , m at the current point in time to indicate "sudden increase," "sudden increase," "sudden decrease," . . . , "constant," respectively.

In the above description, the case where the comparison device 26 determines whether or not state values indicated by a judgment table completely match state values indicated by change trend data throughout channels at each of times $t_n$ to $t_0$ is illustrated by example. However, the aspect of the determination by the comparison device 26 is not limited to this. The comparison device 26 may determine that a notification level is increased as the matching period is increased. Hence, information on the notification level may be predetermined for each period in the storage device 25. The notification level is a degree that brings the user's attention to a notification from the terminal apparatus 10. In the example illustrated in FIG. 6, when the period during which the state values match is from time $t_{-n}$ to time $t_{-2}$, or shorter than that, the notification level is "none." When the period during which the state values match is from time $t_{-n}$ to $t_{-1}$, the notification level is "caution." When the period during which the state values match is from time $t_{-n}$ to the current time to, the notification level is "warning." The comparison device 26 then reads, from the storage device 25, the notification level corresponding to the period during which the state values match. The comparison device 26 outputs information on the read notification level as the comparison result information to the notification output device 28. When the notification level included in the comparison result information is higher than a predetermined notification level (for example, "none"), the notification output device 28 transmits the comparison result information to the terminal apparatus 10.

When receiving the comparison result information from the data processing apparatus 20 via the data acquisition device 12, the data processing device 14 of the terminal apparatus 10 causes the display device 16 to issue a notification in accordance with the notification level indicated by the comparison result information. The notification may include a character string (for example, "caution") indicating the notification level. The data processing device 14 may generate visual data for issuing a notification in a form that becomes more prominent to the user with the increasing notification level. The data processing device 14 may increase, for example, brightness, and the line widths of characters and graphics, with the increasing notification level. Moreover, the data processing device 14 may use yellow and red as background colors of notifications related to "caution" and "warning," respectively. The data processing device 14 outputs the generated visual data to the display device 16. The display device 16 issues a notification with a higher degree that catches the user's attention as the notification level is increased. Hence, the user can intuitionally judge the necessity of dealing with the occurrence of the event.

Moreover, the comparison device 26 may transmit the comparison result data to the control apparatus 30. The control apparatus 30 being a transmission destination uses, for example, time-series data used to derive change trend data being a comparison target, for control. The control apparatus 30 may include a control device (unillustrated sequence logic). The control device may execute control and computation related to control over the plant facility 40 in control mode corresponding to the notification level indicated by the comparison result data received from the comparison device 26. As an example, assume a case where the control apparatus 30 controls the temperature of the plant facility 40. In this case, when receiving comparison result data indicating "caution," the control device changes a temperature set as a control target value to a lower temperature. When receiving comparison result data indicating "warning," the control device sets an output to the actuator to, for example, "0" (a shutdown sequence).

The number of the above-mentioned notification levels is not limited to three, and may be two, or four or more.

Moreover, the case is illustrated by example in which as the period during which state values match each other from time $t_{-n}$ as the starting point of the period during which state values match each other is increased, the notification level illustrated in FIG. 6 is increased. However, the notification level is not limited to this example, depending on the event. The notification level may be determined in such a manner as to be increased as the period during which state values match each other up to the current point in time to as the endpoint of the period during which state values match each other is increased.

The judgment table is created on the basis of, for example, physical assumed values, chemical assumed values, a HAZOP (hazard and operability study), or a simulation result. The data processing apparatus 20 may include a judgment table generation device (not illustrated). The judgment table generation device may use a channel-by-channel time series of past state values to present a channel-by-channel time series of state values for each event that has occurred. The judgment table generation device calculates, for example, an average value of a time series of a slope of each channel within a predetermined period, for each event instructed by the user's operation. In this case, the judgment table generation device generates a judgment table indicating a time series of state values obtained by discretizing the calculated average value. An operation that is accepted by the operation input device 18 of the terminal apparatus 10 in the course of the operation of the control apparatus 30 may be used as the user's operation that instructs an event. The number of judgment tables is not limited to one. It is also possible to use a plurality of judgment tables according to, for example, the event or measurement target.

Modified Example

Figure 7:
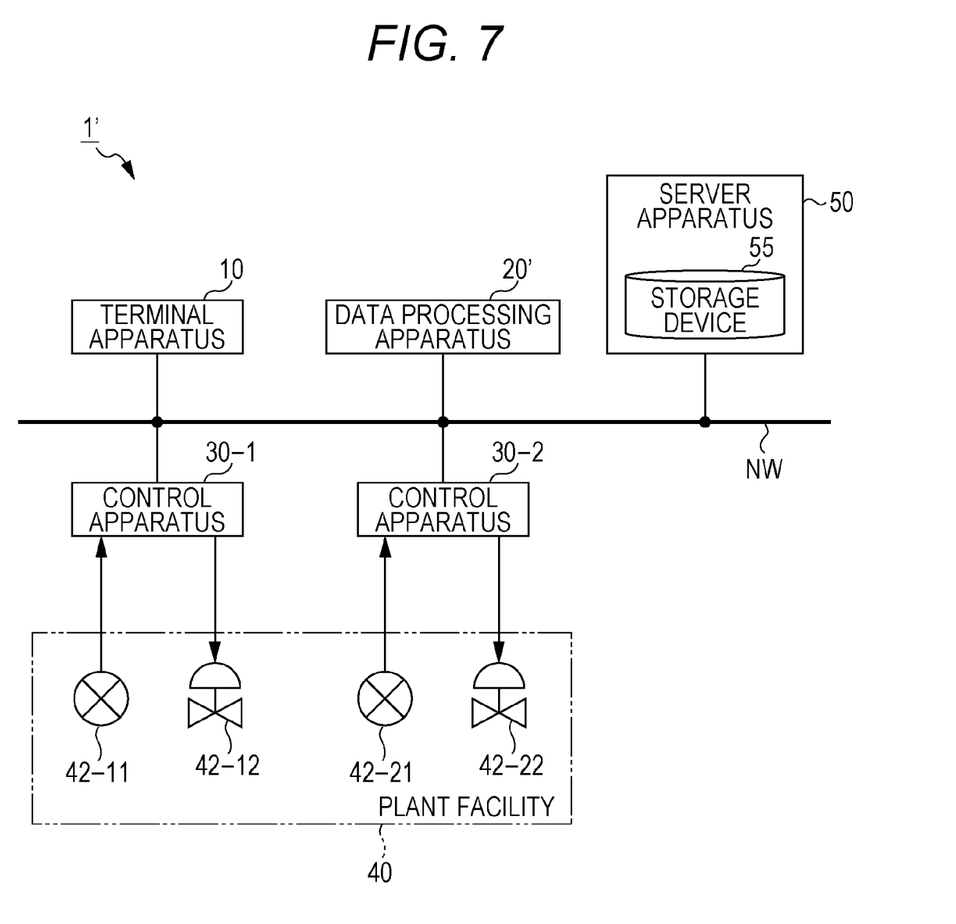
FIG. 7 is a block diagram illustrating an example of the configuration of a control system according to a modified example of one or more embodiments of the invention.

Next, a modified example of one or more embodiments of the invention is described. Different points from the above-mentioned embodiment are mainly described below. FIG. 7 is a block diagram illustrating an example of the configuration of a control system 1' according to the modified example.

The control system 1' according to the modified example is a data processing system configured in such a manner as to include the terminal apparatus 10, a data processing apparatus 20', the control apparatus 30, and a server apparatus 50.

The server apparatus 50 is a cloud server communicably connected to at least the data processing apparatus 20' via the network NW. The server apparatus 50 includes a storage device 55. Judgment tables are previously stored in the storage device 55. For example, when detecting a connection to the data processing apparatus 20' via the network NW, the server apparatus 50 reads the judgment tables from the storage device 55. The server apparatus 50 transmits the read judgment tables to the data processing apparatus 20'. In addition, when the judgment table stored in the storage device 55 has been updated, the server apparatus 50 may transmit the updated judgment table to the data processing apparatus 20'.

Figure 8:
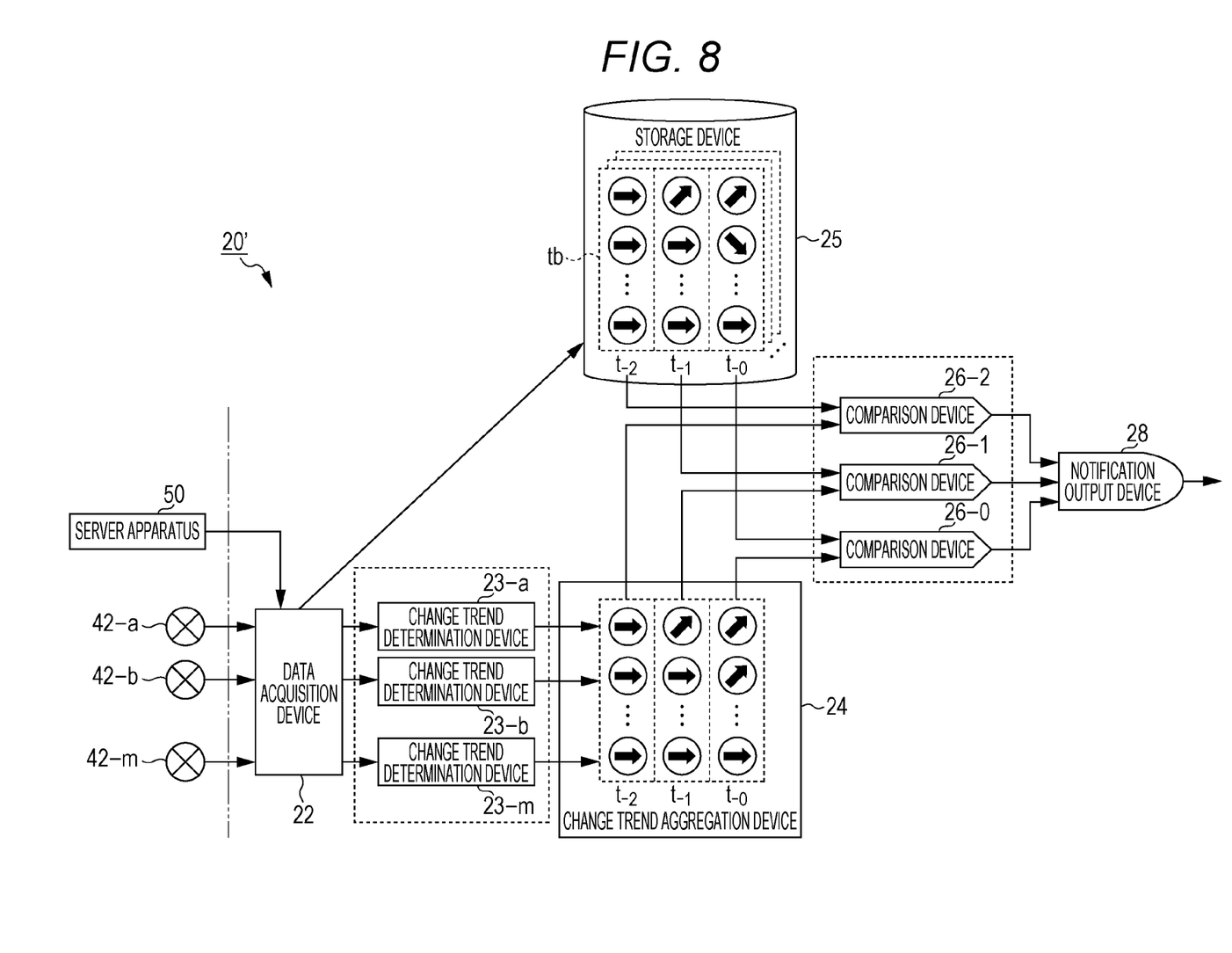
FIG. 8 is a block diagram illustrating an example of the configuration of a data processing apparatus according to a modified example of one or more embodiments of the invention.

Next, the configuration of the data processing apparatus 20' according to the modified example is described.

FIG. 8 is a block diagram illustrating an example of the configuration of the data processing apparatus 20' according to the modified example.

The data processing apparatus 20' includes the data acquisition device 22, the change trend determination device 23, the change trend aggregation device 24, the storage device 25, the comparison device 26, and the notification output device 28, as in the data processing apparatus 20 illustrated in FIG. 2.

The data acquisition device 22 acquires time-series data of each channel. In addition, the data acquisition device 22 receives judgment tables from the server apparatus 50. The data acquisition device 22 stores (caches) the received judgment tables in the storage device 25. When judgment tables have already been stored in the storage device 25, the data acquisition device 22 updates the already stored judgment tables to the newly acquired judgment tables. As described above, a judgment table for each event to be stored is used to be compared with change trend data inputted from the change trend aggregation device 24.

It is assumed in the above-mentioned embodiment that a time interval (time slot width) between points in time, which are adjacent to each other, of state values indicated by a judgment table is constant irrespective of the event. However, the time interval is not limited to this example. The time interval may vary according to the event. The time interval for each event is simply required to be a time interval that can obtain a sufficient degree of accuracy to observe the event. In other words, it is permitted to set a longer time interval for an event whose temporal change in observed values is relatively gentle than for an event involving a rapid temporal change in observed values. The comparison device 26 compares state values indicated by the judgment table with state values indicated by the change trend data in units of the time interval.

Moreover, in FIG. 6, the case where a period of observed values included in the judgment table is n+1 points in time irrespective of the event is illustrated by example. However, the period may vary according to the event. A period of each event is simply required to be a period having a sufficient length to observe the event. In other words, it is permitted to set a longer period for an event whose temporal change in observed values is relatively gentle than for an event involving a rapid temporal change in observed values. The comparison device 26 compares state values indicated by the judgment table with state values indicated by the change trend data over the period.

As described above, the data processing apparatus (for example, the data processing apparatus 20 or 20') according to one or more embodiments of the invention includes the acquisition device (for example, the data acquisition device 22), the change trend calculation device (for example, the change trend calculation device 236), the comparison device (for example, the comparison device 26), and the notification output device (for example, the notification output device 28). The acquisition device acquires time-series data indicating observed values of a plurality of channels at each point in time. The change trend calculation device calculates a change trend in an observed value at each point in time, on a channel-by-channel basis. The comparison device compares change trend data indicating a set of change trends in observed values of the channels within a predetermined time up to the current point in time with a judgment table previously stored in the storage device, the judgment table indicating change trends in observed values at each point in time within the predetermined time. The notification output device outputs a notification related to a temporal change in observed values on the basis of the comparison result.

Moreover, the data processing system (for example, the control system 1 or 1') according to one or more embodiments of the invention may include the above-mentioned data processing apparatus and the notification apparatus (for example, the terminal apparatus 10) that gives the notification.

Moreover, the data processing system (for example, the control system 1') according to one or more embodiments of the invention may further include the electronic device (for example, the server apparatus 50) including the storage device.

With this configuration, a pattern of change trends in observed values of a plurality of channels is compared with a pattern of change trends corresponding to a predetermined event. Hence, the detection accuracy of an abnormality or an event of a sign pointing to the abnormality is increased. A user comes into contact with a notification outputted on the basis of the comparison result. Accordingly, it is possible to grasp the occurrence of the event without monitoring time-series data of the plurality of channels at a time. Hence, the user can appropriately grasp an event occurring in a process. Hence, a burden of the monitoring is reduced.

Moreover, a judgment table is stored event by event in the storage device. The comparison device specifies a judgment table with the highest degree of matching with the change trend data. Moreover, the notification output device outputs information on an event corresponding to the judgment table specified by the comparison device.

With the configuration, the user can grasp the occurrence of various events without monitoring time-series data of the plurality of channels at a time. Hence, the user can appropriately grasp an event occurring in the process without depending heavily on the operational capability.

Moreover, the notification output device determines the notification level in such a manner that as the degree of matching between the change trend data and the judgment table is increased, the degree that brings attention to the notification is increased.

With the configuration, as the possibility of occurrence of a predetermined event is increased, a notification about the occurrence is given at a higher notification level. Hence, the user intuitionally grasps the necessity (for example, urgency) to deal with the event related to the notification, and is encouraged to take a measure in accordance with the necessity. Examples of the measure include actions for the stop of the operation, operation control such as a change in parameter, and an inquiry to a skilled user such as an expert.

Moreover, the data processing apparatus includes the time-series range extraction device (for example, the time-series range extraction device 234). The time-series range extraction device extracts time-series data indicating an observed value(s) at one or a plurality of points in time within an analysis range from a first point in time to a second point in time. Moreover, the change trend calculation device calculates a slope of a liner function indicating a change trend in the observed values within the analysis range in such a manner as to minimize an objective function. The objective function is the sum of multiplied values at the points in time within the analysis range. The multiplied value is a numerical value obtained by multiplying a square value of a difference between a function value of the linear function and the observed value by a weight coefficient. The weight coefficient is a numerical value that becomes greater with the increasing elapsed time from the first point in time to each point in time.

According to the configuration, the slope of the linear function is calculated, placing more importance on an observed value at a point in time closer to the current point in time. Hence, the phase of the function value of the linear function indicating the trend of change in the observed value is not delayed with respect to the observed value at the current point in time. Therefore, a random temporal change is reduced or removed as the slope of the observed value. In addition, a value is obtained which represents the quantified trend of change in the observed value matching the intuition of a person.

Up to this point one or more embodiments of the invention have been described with reference to the drawings. However, the specific configuration is not limited to the embodiments. Various design changes and the like can be made within the scope that does not depart from the gist of the embodiments of the present disclosure.

For example, the numbers of the terminal apparatuses 10, the data processing apparatuses 20 and 20', the control apparatuses 30, and the field devices 42 in the control systems 1 and 1' are not limited to the above-mentioned numbers. Their numbers may be greater or less than the above-mentioned numbers. The number of pieces of time-series data acquired by the data acquisition device 22 of the data processing apparatus 20 or 20', that is, the number of channels, is simply required to be one or more. Time-series data acquired by the data acquisition device 22 is not necessarily limited to time-series data including, as an observed value, a measurement value measured by the field device 42. The time-series data may include, as the observed value, a state quantity indicating the state of each of the field device 42, and an I/O module for inputting and outputting data into and from the field device 42.

In the examples illustrated in FIGS. 2 and 8, there is a plurality of the change trend determination devices 23. However, the number of the change trend determination devices 23 is not limited to this. The number of the change trend determination devices 23 is simply required to be at least one. Moreover, the number of channels of time-series data processed by each change trend determination device 23 is not limited to one. Time-series data of a plurality of channels may be processed. Moreover, part of time-series data acquired by the data acquisition device 22 may become a processing target in any of the change trend determination devices 23, and the remaining time-series data may not become the processing target.

Moreover, in FIG. 4, the case where the terminal apparatus 10 includes the display device 16 and the operation input device 18 is illustrated by example. However, the aspect of the terminal apparatus 10 is not limited to this. Part or both of the display device 16 and the operation input device 18 may not be included in the terminal apparatus 10 as long as they can transmit and receive data to and from other portions of the terminal apparatus 10.

Moreover, in the example illustrated in FIG. 5, it is assumed that the terminal apparatus 10 and the data processing apparatus 20 belong to different network layers, respectively. However, the configuration of the control system 1 is not limited to this. The control system 1 according one or more embodiments of the invention may have a horizontal distribution configuration. In the horizontal distribution configuration, for example, the terminal apparatus 10, the control apparatus 30, the I/O module, and the field device 42 may be connected to the same network layer.

The data processing apparatus of the present disclosure may be configured in such a manner that part of the terminal apparatus 10, the data processing apparatus 20, and the control apparatus 30 according to the above-mentioned embodiment is realized by a computer. In this case, a program for achieving the control function is recorded in a computer-readable recording medium, the recorded program is read into a computer system, and the read program is executed by a computation processing circuit such as a CPU. Accordingly, the control function may be achieved. The "computer system" here is a computer system embedded in the terminal apparatus 10, the data processing apparatus 20, or the control apparatus 30. An OS and hardware such as a peripheral device are also included in the computer system. Moreover, examples of the "computer-readable recording medium" include storage devices such as portable media including a flexible disk, a magneto-optical disk, a ROM, and a CD-ROM, and a hard disk built in the computer system. Furthermore, the "computer-readable recording medium" also includes a recording medium that holds the program dynamically in short time, such as a communication line that transmits the program via a communication line such as a network, for example, the Internet, or a telephone line, and a recording medium that holds the program for a fixed period of time, such as volatile memory in a server, or the computer system acting as a client in this case. Moreover, the program may be a program for achieving a part of the above-mentioned functions. Furthermore, the above-mentioned functions may be achieved in a combination with the program that has already been recorded in the computer system.

Moreover, a part or all of the terminal apparatus 10, the data processing apparatus 20, and the control apparatus 30 in the above-mentioned embodiment may be realized as an integrated circuit such as LSI (large scale integration). Each functional block of the terminal apparatus 10, the data processing apparatus 20, and the control apparatus 30 may be made as a processor. Moreover, a part or all of the functional blocks may be integrated into the processor. Moreover, a method for integrating circuits is not limited to LSI. An integrated circuit may be realized by a dedicated circuit or general-purpose processor. Moreover, if a technology for the integration of circuits as an alternative to LSI appears with the progress of the semiconductor technology, an integrated circuit by the technology may be used.

The data processing apparatus of the present disclosure may be the following first to fourth data processing apparatuses:

The first data processing apparatus includes: an acquisition device configured to acquire time-series data indicating observed values of a plurality of channels at a plurality of points in time; a change trend calculation device configured to calculate a change trend in an observed value at each of the points in time on a channel-by-channel basis; a comparison device configured to compare change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output device configured to output a notification related to a temporal change in the observed value on the basis of a result of the comparison.

The second data processing apparatus is the first data processing apparatus in which the judgment table is stored event by event in the storage device, the comparison device specifies the judgment table with the highest degree of matching with the change trend data, and the notification output device outputs information on an event corresponding to the judgment table specified by the comparison device.

The third data processing apparatus is the first or second data processing apparatus in which the notification output device determines a notification level that is a degree that brings attention to the notification in accordance with the degree of matching between the change trend data and the judgment table.

The fourth data processing apparatus is any of the first to third data processing apparatuses including a time-series range extraction device configured to extract time-series data indicating an observed value at each point in time within an analysis range from a first point in time to a second point in time, in which the change trend calculation device calculates a slope of a linear function indicating a change trend in the observed values in the analysis range in such a manner as to minimize an objective function, the objective function is the sum of multiplied values at the points in time within the analysis range, the multiplied value is a numerical value obtained by multiplying a square value of a difference between a function value of the linear function and the observed value by a weight coefficient, and the weight coefficient is a numerical value that becomes higher with increasing elapsed time from the first point in time to each point in time.

The data processing system of the present disclosure includes: any of the first to fourth data processing apparatuses; and a control apparatus configured to control a plant, in which the notification output device determines that the notification level is increased as the degree of matching between the change trend data and the judgment table is increased, and the control apparatus has a control device configured to execute the control in control mode corresponding to the notification level.

The data processing method of the present disclosure is a data processing method in a data processing apparatus, and includes: an acquisition step of acquiring time-series data indicating observed values of a plurality of channels at a plurality of points in time; a change trend calculation step of calculating a change trend in an observed value at each of the points in time on a channel-by-channel basis; a comparison step of comparing change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output step of outputting a notification related to a temporal change in the observed value on the basis of a result of the comparison.

The program of the present disclosure causes a computer of a data processing apparatus to execute: an acquisition procedure of acquiring time-series data indicating observed values of a plurality of channels at a plurality of points in time; a change trend calculation procedure of calculating a change trend in an observed value at each of the points in time on a channel-by-channel basis; a comparison procedure of comparing change trend data indicating a set of change trends of observed values of the channels within a predetermined time up to the current point in time with judgment tables previously stored in a storage device, the judgment tables indicating a change trend in an observed value at each of a plurality of points in time within the predetermined time; and a notification output procedure of outputting a notification related to a temporal change in the observed value on the basis of a result of the comparison.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A data processing apparatus comprising:
an acquisition circuit that acquires first time-series data comprising a plurality of values observed in a plurality of channels at a plurality of points in time;
a change trend calculation circuit that calculates a change trend of the observed values at each of the points in time on a channel-by-channel basis;
a memory that stores a plurality of judgment tables each indicating a change trend of previous values at each of the points in time within a predetermined time period up to the current point in time;
a comparison circuit that compares change trend data comprising a set of change trends of the observed values for each of the channels within the predetermined time period with the judgment tables; and
a notification output circuit that outputs, to a control apparatus that controls a plant, a notification related to a temporal change in the observed values on the basis of a result of the comparison, wherein
the notification output circuit determines that a notification level is increased as a degree of matching between the change trend data and one of the judgment tables is increased, and
the control apparatus has a control circuit that controls the plant in a control mode corresponding to the notification level.

2. The data processing apparatus according to claim 1, wherein
each of the judgment tables is stored event by event in the memory,
the comparison circuit specifies one of the judgment tables with the highest degree of matching with the change trend data, and
the notification output circuit outputs information on an event corresponding to the judgment table specified by the comparison circuit.

3. The data processing apparatus according to claim 1, wherein the notification level is a degree that brings attention to the notification in accordance with the degree of matching between the change trend data and one of the judgment tables.

4. The data processing apparatus according to claim 1, further comprising:
a time-series range extraction circuit that extracts second time-series data comprising a plurality of values observed at each point in time within an analysis range from a first point in time to a second point in time, wherein
the change trend calculation circuit calculates a slope of a linear function indicating a change trend in the observed values in the analysis range in such a manner as to minimize an objective function,
the objective function is the sum of multiplied values at the points in time within the analysis range,
the multiplied value is a numerical value obtained by multiplying a square value of a difference between a function value of the linear function and the observed value by a weight coefficient, and the weight coefficient is a numerical value that becomes higher with increasing elapsed time from the first point in time to each point in time.

5. A data processing system comprising:
a data processing apparatus that comprises:
an acquisition circuit that acquires first time-series data comprising a plurality of values observed in a plurality of channels at a plurality of points in time;
a change trend calculation circuit that calculates a change trend of the observed values at each of the points in time on a channel-by-channel basis;
a memory that stores a plurality of judgment tables each indicating a change trend of previous values at each of the points in time within a predetermined time period up to the current point in time;
a comparison circuit that compares change trend data comprising a set of change trends of the observed values for each of the channels within the predetermined time period with the judgment tables; and
a notification output circuit that outputs a notification related to a temporal change in the observed values on the basis of a result of the comparison; and
a control apparatus that controls a plant, wherein
the notification output circuit determines that a notification level is increased as a degree of matching between the change trend data and one of the judgment tables is increased, and
the control apparatus has a control circuit that controls the plant in a control mode corresponding to the notification level.

6. A data processing method comprising:
acquiring first time-series data comprising a plurality of values observed in a plurality of channels at a plurality of points in time;
calculating a change trend of the observed values at each of the points in time on a channel-by-channel basis;
comparing change trend data comprising a set of change trends of the observed values for each of the channels within a predetermined time period up to the current point in time with a plurality of judgment tables each indicating a change trend of previous values at each of the points in time within the predetermined time;
outputting, to a control apparatus that controls a plant, a notification related to a temporal change in the observed value on the basis of a result of the comparison;
determining that a notification level is increased as a degree of matching between the change trend data and one of the judgment tables is increased; and
causing the control apparatus to control the plant in a control mode corresponding to the notification level.

7. A non-transitory computer-readable recording medium that has recorded a program causing a computer included in a data processing apparatus to execute:
acquiring first time-series data comprising a plurality of values observed in a plurality of channels at a plurality of points in time;
calculating a change trend of the observed value at each of the points in time on a channel-by-channel basis;
comparing change trend data comprising a set of change trends of the observed values for each of the channels within a predetermined time period up to the current point in time with a plurality of judgment tables each indicating a change trend of previous values at each of the points in time within the predetermined time;

outputting, to a control apparatus that controls a plant, a notification related to a temporal change in the observed value on the basis of a result of the comparison;

determining that a notification level is increased as a degree of matching between the change trend data and one of the judgment tables is increased; and causing the control apparatus to control the plant in a control mode corresponding to the notification level.

* * * * *